United States Patent
Wu et al.

(10) Patent No.: US 9,753,349 B2
(45) Date of Patent: Sep. 5, 2017

(54) OPTICAL CIRCUIT APPARATUS, METHOD, AND APPLICATION

(75) Inventors: Hui Wu, Pittsford, NY (US); Shang Wang, Rochester, NY (US)

(73) Assignee: University of Rochester, Rochester, NY (US)

( * ) Notice: Subject to any disclaimer, the term of this patent is extended or adjusted under 35 U.S.C. 154(b) by 681 days.

(21) Appl. No.: 13/213,612

(22) Filed: Aug. 19, 2011

(65) Prior Publication Data
US 2012/0045163 A1    Feb. 23, 2012

Related U.S. Application Data

(60) Provisional application No. 61/375,507, filed on Aug. 20, 2010.

(51) Int. Cl.
*G02B 6/26* (2006.01)
*G02F 1/225* (2006.01)

(52) U.S. Cl.
CPC .......... *G02F 1/225* (2013.01); *G02F 2203/15* (2013.01); *G02F 2203/585* (2013.01)

(58) Field of Classification Search
CPC .......... G02F 2203/585; G02F 2203/54; H01S 2301/08
See application file for complete search history.

(56) References Cited

U.S. PATENT DOCUMENTS

| | | | | |
|---|---|---|---|---|
| 4,652,079 A * | 3/1987 | Shaw | ..................... | G02B 6/264 359/900 |
| 4,815,804 A * | 3/1989 | Desurvire | ............ | G02B 6/2861 359/900 |
| 4,904,041 A * | 2/1990 | Izadpanah | ............ | G02B 6/2861 372/18 |
| 5,572,611 A * | 11/1996 | Jinguji et al. | ................... | 385/17 |
| 6,853,756 B2 * | 2/2005 | Gerlach et al. | ................... | 385/1 |
| 7,245,801 B2 * | 7/2007 | Boyd | ................. | G02B 6/12004 372/97 |
| 7,729,572 B1 * | 6/2010 | Pepper et al. | .................. | 385/27 |
| 2002/0061164 A1 * | 5/2002 | Hall | ...................... | G02B 6/2861 385/24 |
| 2002/0080436 A1 * | 6/2002 | Hait | ...................... | H04J 14/002 398/53 |
| 2003/0090767 A1 * | 5/2003 | Yap | ...................... | G02B 6/2861 398/183 |
| 2005/0013538 A1 * | 1/2005 | Yamazaki | ....................... | 385/27 |
| 2005/0047791 A1 * | 3/2005 | Miyazaki | ............. | H04B 10/504 398/147 |
| 2005/0196103 A1 * | 9/2005 | Kaplan | .............. | G02B 6/12007 385/50 |
| 2007/0019900 A1 * | 1/2007 | Taylor et al. | ................... | 385/14 |
| 2009/0022189 A1 * | 1/2009 | Okuno | .......................... | 372/25 |
| 2009/0072811 A1 * | 3/2009 | Marciante | ............ | G01R 29/027 324/76.12 |
| 2009/0180786 A1 * | 7/2009 | Arahira | ........................ | 398/189 |
| 2012/0057882 A1 * | 3/2012 | Arahira | ........................ | 398/186 |

* cited by examiner

*Primary Examiner* — Chris Chu
(74) *Attorney, Agent, or Firm* — Cooper & Dunham LLP

(57) ABSTRACT

A new photonic integrated circuit in the form of an optical pulse-train generator utilizes a time-interleaved architecture. The circuit can generate multiple optical pulses sequentially from a single trigger pulse, with the timing and amplitude of each pulse determined by circuit design. The circuit has application in optical arbitrary waveform generation and ultrafast electro-optic modulation.

14 Claims, 8 Drawing Sheets

(a)

(b)

OPTICAL CIRCUIT APPARATUS, METHOD, AND APPLICATION

RELATED APPLICATION DATA

This application claims the benefit of priority under 35 U.S.C. §119(e) to U.S. provisional application Ser. No. 61/375,507 filed on Aug. 20, 2010, the subject matter of which is hereby incorporated by reference in its entirety.

STATEMENT OF GOVERNMENT INTEREST

This invention was made with government support under Grant No. 0829915 awarded by the National Science Foundation. The government has certain rights in the invention.

BACKGROUND

Field of the Invention

Embodiments of the invention are generally directed to optical circuits; more particularly to electronic-photonic apparatus including, but not limited to, photonic integrated circuits; electronic-photonic integrated circuits (EPICs); optical pulse-train generators; a microring-based optical pulse-train generator; a time-interleaved optical pulse-train generator; an optical arbitrary waveform generator, associated methods, and applications.

Description of Related Art

Recent advances in silicon photonics have highlighted various electronic-photonic integrated circuits (EPICs) that can or soon will seamlessly integrate photonic devices with ultrafast electronics. Microring-based devices such as add-drop filters and modulators exhibit good optical performance with ultracompact device size, especially in high index contrast systems like silicon-on-insulator (SOI) technologies, hence potentially enabling very large scale EPICs. For example, Q. Xu et al., "Silicon microring resonators with 1.5-μm radius," Opt. Express 16, 4309-4315 (2008) have demonstrated silicon microrings with 1.5 μm radii; others have proposed that millions of these devices can be used in an on-chip optical interconnect system.

Research efforts to date have focused on the filtering characteristics of microring circuits in the wavelength domain and their applications in wavelength-division multiplexing. For example, Little et al., "Microring resonator channel dropping filters," J. Lightwave Technol. 15, 998-1005 (1997) derived the time-dependent transfer functions of a microring resonator with the basic add-drop configuration, treating the ring only as a filter in the wavelength domain. Time-domain properties of microring-based devices and their circuit applications have not been sufficiently explored, which can open up various important applications, e.g., microring-based optical delay lines with large group delays in an extremely small footprint as reported by F. Xia et al., "Ultracompact optical buffers on a silicon chip," Nat Photon 1, 65-71 (2007). The inventors have thus recognized the advantages and benefits obtainable by exploring the time-domain applications of microrings on the circuit level, and the problem solutions these investigations would provide.

Further advantages, benefits, and solutions will be available by addressing the fundamental challenge in EPIC; i.e., the large potential bandwidth of photonics vs. the significantly lower speed of electronics. o overcome this mismatch, wavelength-division multiplexing can be used to split the large optical bandwidth in the wavelength domain. Another approach is to time-share the optical bandwidth by applying a time interleaving technique. Time interleaving has been widely used in the high-speed electronic circuits, such as analog-to-digital converters (ADCs), increasing the overall sampling rate by operating two or more data converters in parallel. Recently, time interleaving has also been introduced to EPICs, e.g., the photonic-assisted interleaved ADC as reported by G. C. Valley, "Photonic analog-to-digital converters," Opt. Express 15, 1955-1982 (2007).

The inventors have thus recognized the advantages and benefits, and solutions that will be available by utilizing time interleaving techniques directly in the optical domain. Microring-based devices such as add-drop filters and modulators exhibit good optical performance with ultracompact device size, especially in high index contrast systems like silicon-on-insulator (SOI) technologies, hence potentially enabling very large scale EPICs. Therefore, using microring resonators as couplers to implement an optical pulse-train generator would result in an ultra-compact device compared to conventional technology. Such an optical pulse-train generator, e.g., could be applied to ultrafast optical arbitrary waveform generation. Unlike the conventional spatial approach of arbitrary waveform generation, such as chirp filters, frequency-to-space mapping or time-to-space mapping together with spatial modulation, a time-domain approach as proposed herein below could advantageously be utilized in high-speed instrumentation or applied in ultrahigh data rate optical communication at. Furthermore, our time-domain approach is more intuitive, easy to control, and allows more flexibility in output waveform generation.

SUMMARY

An embodiment of the invention is directed to a time-interleaved photonic apparatus. The apparatus includes an input optical waveguide, two or more coupler stages disposed in series along the input optical waveguide, wherein each coupler stage is characterized by a coupling coefficient that can be adjusted to determine an amplitude of an output optical pulse from each coupler stage, two or more optical time-delay stages each one of which is disposed between each adjacent pair of coupler stages, wherein each of the time-delay stages is characterized by an adjustable time delay, and an optical combiner that optically combines the output pulses of the coupler stages. A customized output waveform will be created from, two or more of the time-interleaved optical signals outputted from the two or more coupler stages and then outputted from the output combiner. In various non-limiting aspects:

each coupler stage is at least one optical microring resonator;

the at least one optical microring resonator is an electro-optic modulator;

the apparatus further includes a digital data bus coupled to the at least one of the electro-optic modulators, wherein digital data to be transmitted can directly modulate each microring modulator to generate a modulated, customized output pulse train waveform;

the output combiner is either a Y-junction or a multimode interference coupler;

the optical waveguides and the at least one optical microring resonator are silicon and are built on a silicon on insulator (SOI) platform;

the at least one optical microring resonator has a racetrack configuration;

the at least one optical microring resonator has a square configuration;

the at least one optical microring resonator has a rectangular configuration;

the two or more optical microring resonators have the same resonant frequency;

the two or more optical microring resonators each have a different resonant frequency;

the coupling coefficients have been adjusted to provide equal power coupling of the input optical pulse into each respective coupler stage;

each coupler stage has a different gap distance from the input optical waveguide;

the apparatus is a single wavelength optical pulse train generator (OPTG$_{\lambda(1)}$).

Another, illustrative embodiment of the invention is a multi-wavelength optical pulse train generator (OPTG$_{\lambda(n)}$). In the OPTG$_{\lambda(n)}$, M stages resonate at M different frequencies instead of at the same frequency as in the single-wavelength OPTG$_{\lambda(1)}$. The OPTG$_{\lambda(n)}$ utilizes a broadband input trigger signal, such as ultra-short pulses from a femtosecond fiber laser, whose bandwidth covers all of the M channels. All of the M stages are coupled to input trigger waveguide in series. When the input pulse propagates in the trigger waveguide, the input power at the different resonant frequencies is coupled into the corresponding stages, generating pulses with different center frequencies at the stage outputs. In an advantageous aspect, higher-order microring add-drop filters, which have faster roll-offs, are used to reduce the crosstalk between adjacent stages. As each stage acts as a narrow-band filter, the output pulses will become wider in the time domain, compared to the input pulse. As in the single-wavelength OPTG$_{\lambda(1)}$, delay units are disposed between stages in the input trigger waveguide, which generate a temporal stage delay between the pulses, determining the repetition rate of the output pulse train. A single output waveguide rather than an optical combiner (e.g., M-to-1 multi-branch power combiner) is used to combine all the stage outputs and form the optical pulse train. Because different stage output pulses have different wavelengths, they will not be coupled back into the other stages when passing through them, i.e. there is no "back-coupling" problem. This removes the need to use, e.g., an M-to-1 multi-branch power combiner at the circuit output, eliminating the 10 log$_{10}$ M dB power loss caused by "asynchronous" optical power combination.

An embodiment of the invention is a time domain method for generating an optical arbitrary waveform. The method involves the steps of providing a single optical trigger pulse, applying a plurality of sequential time delays to the single optical trigger pulse to provide a plurality, M, of sequentially time-delayed trigger input pulses, coupling each of the sequentially time delayed trigger input pulses into each of a respective plurality M of coupler-optical resonator stages each having a coupling coefficient to produce an output sub-pulse from each respective coupler-optical resonator stage, adjusting the timing of each of the M output sub-pulses via the sequential time delays, adjusting an amplitude of each of the M output sub-pulses via the coupling coefficients, and combining the M time-delayed, amplitude-adjusted output sub-pulses to form an output optical pulse train in the form of the optical arbitrary waveform from the single optical trigger pulse. In various non-limiting aspects:

each of a respective plurality M of coupler-optical resonator stages includes at least one optical microring resonator;

the method further involves modulating the single optical trigger pulse and generating a modulated output optical pulse train in the form of the optical arbitrary waveform from the single optical trigger pulse;

the method further involves coupling equal amplitude, time-delayed trigger input pulses into the coupler-optical resonator stages;

the method further involves detuning a center wavelength of the single optical trigger pulse from a resonance peak of each of the coupler-optical resonator stages.

BRIEF DESCRIPTION OF THE DRAWINGS

The embodied invention will be better understood from the following description and in consideration with the accompanying figures. It is to be expressly understood, however, that each of the figures is provided to further illustrate and describe the invention and is not intended to further limit the invention claimed.

DETAILED DESCRIPTION OF EMBODIMENTS OF THE INVENTION

Figure 1:
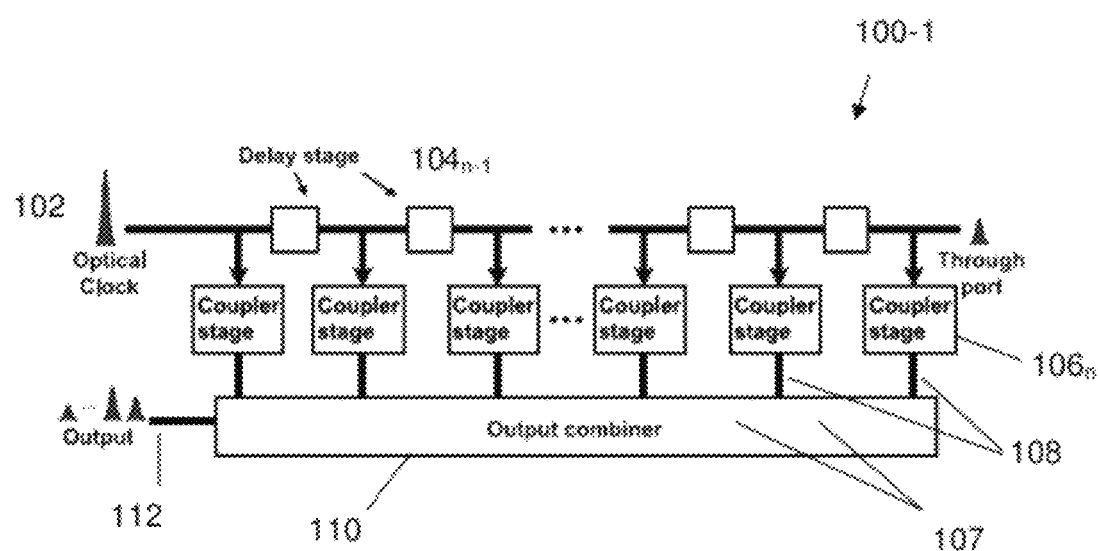
FIG. 1 is a schematic of a generic optical pulse-train generator according to an illustrative embodiment of the invention.

A generalized optical pulse train generator embodiment 100-1 is shown in FIG. 1. One single optical trigger pulse 102 is divided by multiple delay stages 104$_{n-1}$ and coupler stages 106$_n$ to generate multiple sub-pulses 107. The delayed pulse is partially coupled into each coupler stage and dropped at the stage output 108. An output combiner 110 combines the dropped sub-pulses 107, which appear at different times to form an optical pulse train 112 at the output. The timing of the output pulses is determined by the stage delays, while the pulse amplitude is controlled by the coupling coefficients. The circuit performs the function of generating multiple optical pulses sequentially from a single trigger pulse, with the timing and amplitude of each pulse determined by circuit design.

Figure 2:
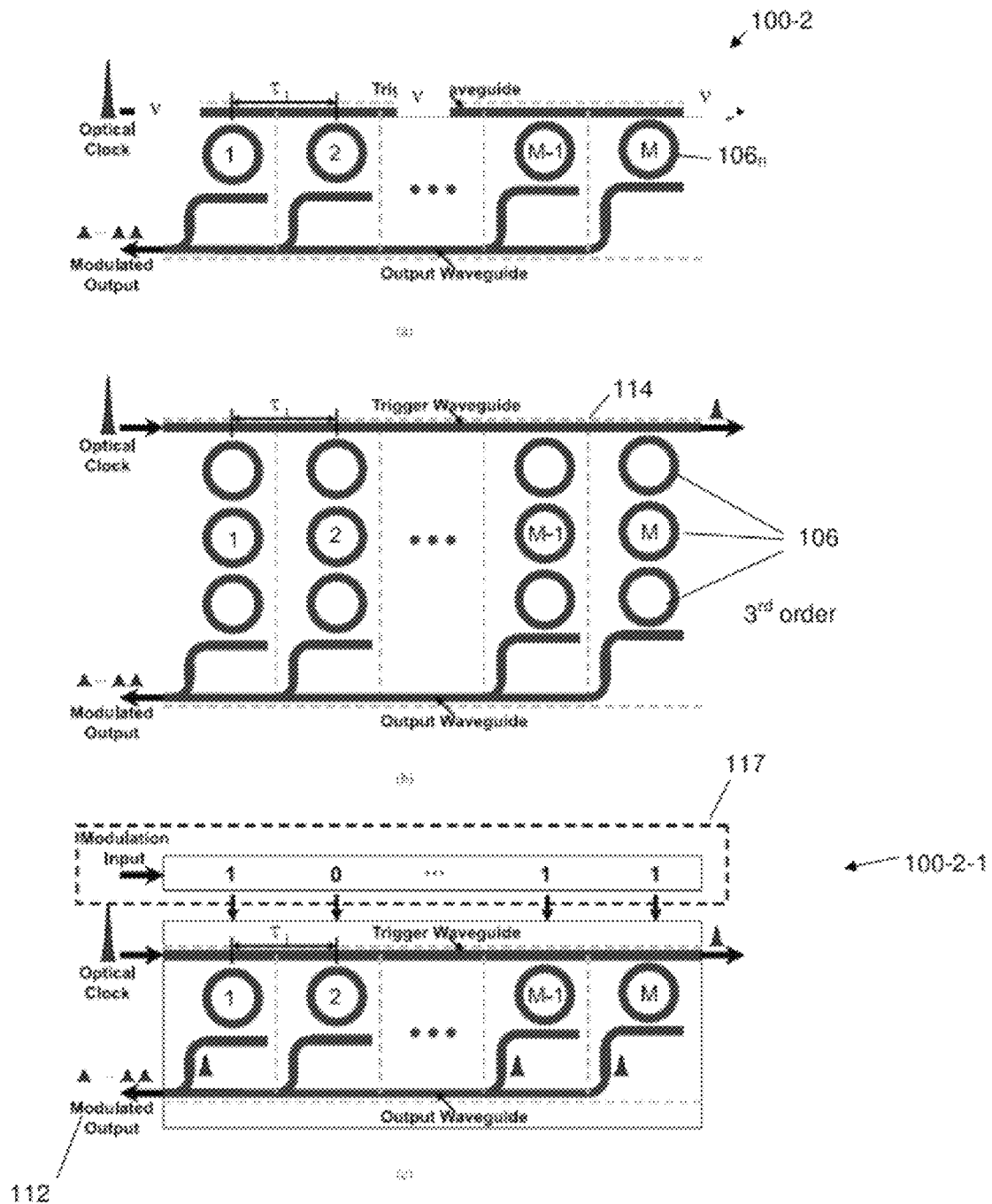
FIG. 2 shows: a) A schematic of a single wavelength M-tap, first-order pulse-train generator OPTG$_{\lambda(1)}$; (b) A single wavelength M-tap, third-order pulse-train generator; (c) A single wavelength M-tap, first-order pulse-train modulator, according to illustrative embodiments of the invention.

FIG. 2(a) schematically shows a single wavelength M-tap, first-order pulse-train generator 100-2 implemented with ultra-compact microring resonators $106_n$ as the coupler stages. Each coupler stage consists of a microring add-drop filter, which can be either a single ring resonator as shown in FIG. 2(a), or higher-order configuration such as the third-order filters illustrated in FIG. 2(b). All of the microring stages 106 are coupled to the input trigger waveguide 114 in series as shown. Optical delay lines are inserted between the stages to introduce a stage (temporal) delay τ. The temporal delay value can be different for different stages, based on the circuit application. The amplitudes of these M sub-pulses can be controlled by properly adjusting the coupling coefficient of each stage, as known in the art.

Different from the filtering function of microrings in conventional WDM application, the embodied time-interleaved circuit uses each ring resonator as a compact switch or coupler. When there is an input pulse, its power is partially coupled into all of the M stages, circulating in the microrings and dropped at the output of each stage. Therefore, one input pulse will trigger multiple sub-pulses at the output. The ultra-compact size of the embodied microring coupler shows advantageously competes with large, conventional directional couplers.

The embodied circuit may find its application in optical arbitrary waveform generation. Unlike the conventional spatial approach of arbitrary waveform generation, such as chirp filters, frequency-to-space mapping, or time-to-space mapping together with spatial modulation, the time-interleaved approach combines multiple narrow basis pulses, which are generated at a specific sampling time, to form a customized output waveform. Therefore, each stage output in our can be viewed as one basis pulse. The final customized output waveform can be generated by modifying the sampling rate and the amplitudes of basis pulses through the control of the stage delay and the coupling coefficient of each stage. Arbitrary waveform generation is highly advantageous in high-speed instrumentation and the ultrahigh data rate optical communication field.

The embodied circuit can also be implemented as an ultrafast electro-optic modulation apparatus 100-2-1. As illustrated in FIG. 2(c), when the microring in each stage is an electro-optic modulator, the circuit can be used as a direct pulse train modulator. The digital data to be transmitted, shown in the dash line box 117, can directly modulate each microring and generate the corresponding modulated output pulse train 112, enabling ultrafast optical data transmission. The circuit utilizes a time domain multiplexing (TDM) system with a time frame that is the same as the period of input trigger signal. While the M stages are considered as the M sub-channels, the timeslot of each sub-channel is determined by the stage delay τ. The embodied circuit demonstrates an elegant combination of modulation and multiplexing in a simple and cost effective solution compared to the WDM approach.

ILLUSTRATIVE EXAMPLE

Figure 3:
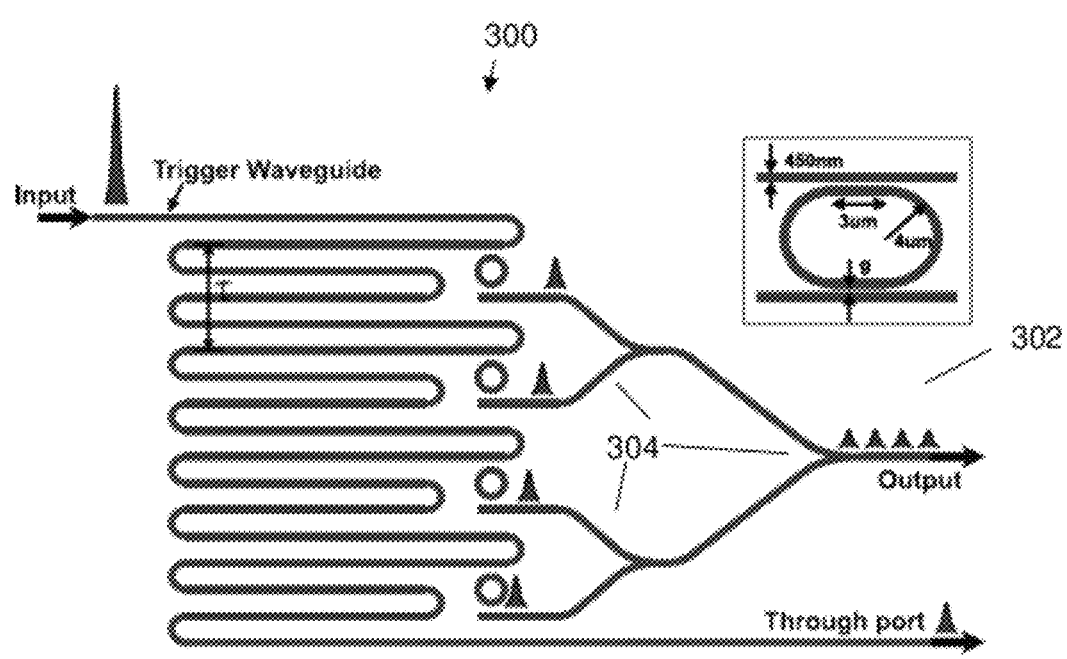
FIG. 3 shows a schematic of a four-tap, first order pulse-train generator, according to an illustrative, exemplary aspect of the invention.

We designed a prototype four-tap, first order pulse-train generator 300 as schematically illustrated in FIG. 3. Very low loss SOI bends with radii of only a few microns has already been demonstrated in the art, therefore, delay between each stage was introduced by the meandering waveguides to save chip area. A 4 mm delay line was inserted between each stage to produce a 50 ps time delay. With a bending radius of 5 mm, the total device area was only 0.18 mm$^2$ The output combiner was implemented by a symmetric four-port power splitter/combiner 302 that consisted of three Y-junctions 304. There was a 6 dB power loss because of asynchronous branch input.

The silicon waveguides and microrings were all built on a SOI platform with 250 nm top silicon and 3 mm buried oxide. Both waveguides and resonators have a cross section of 450 nm×250 nm for the single mode operation. As shown in the inset of FIG. 3, a racetrack resonator configuration was used instead of ring resonator configuration for better coupling control. The racetrack was designed to have a radius of 4 mm and a straight coupling length of 3 mm, which corresponded to a ring resonator with an effective radius of 5 mm. All the resonators have the same dimensions and thus resonate at the same frequency.

Figure 4:
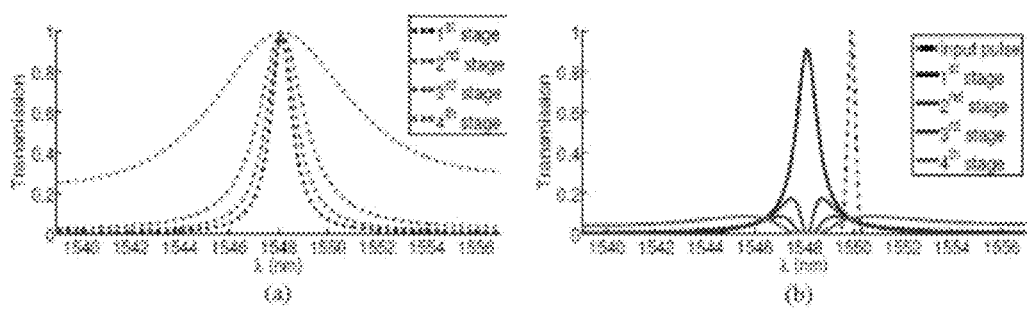
FIG. 4: (a) Normalized drop port transmission of the add-drop filter in each stage, Drop$_m$=b$_{N+1,m}$/a$_{0,m}$; (b) Normalized transmission at each stage output in a microring network, according to illustrative aspects of the invention.

Equal power coupling to all the stages was achieved by adjusting the coupling coefficient of each stage, such as changing the gaps between rings and waveguides. FIG. 4(a) shows the normalized drop port transmission of the add-drop filter in each stage, $Drop_m = b_{N+1,m}/a_{0,m}$, with different coupling coefficients. Due to the waveguide loss of the delay lines and the power drained by the prior stages, microrings in the latter stages were placed closer to the waveguides to increase the coupling coefficient. Assuming a waveguide loss of about 3 dB/cm, the designed coupling coefficients in FIG. 4(a) were 0.16, 0.22, 0.31 and 0.70 for the first to the fourth stage, respectively. The corresponding gaps between the racetrack and input/output waveguides were 160 nm, 140 nm, 120 nm, and 70 nm determined by FDTD simulations. However, coupling coefficients could also be controlled by changing the coupling length in a square-shape ring instead of changing the gaps between rings and waveguides, maintaining the same perimeter of the resonator by adjusting the length of the perpendicular arms. This approach results in a more accurate wavelength and coupling control since small gaps, such as those less than 100 nm, are not easy to control in fabrication.

Using a transfer matrix analysis, the normalized transmission at each stage output, $Drop_m = b_{N+1,m}/a_{0,m}$, in a four-tap, first order microring network is shown in FIG. 4(b). The stages behind the first one have a notch at the resonant frequency because most of the input power at that frequency is drained at the first stage. As a result, equal power coupling could be intuitively achieved by detuning the center frequency of the input pulse off-resonance (blue dash-dot line in FIG. 4(b)), so that the power transmission of all the stages in the pulse bandwidth are approximately the same. To that purpose, the input pulse was relatively narrow-band; for example, a picosecond modelocked laser diode could be used as the optical source. In our design, we used a 10 ps input pulse around 1550 nm.

Figure 5:
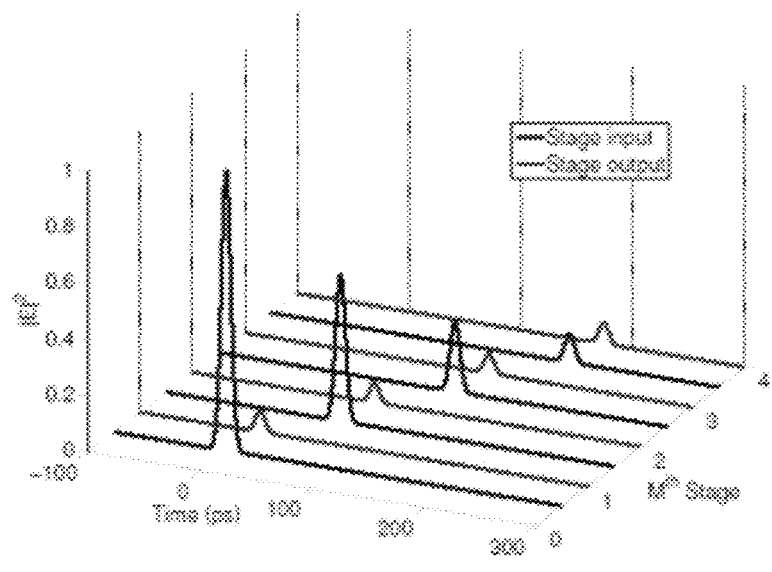
FIG. 5: Time domain behavior of the four-tap, first order pulse-train generator of FIG. 3; (a) Pulse propagation in the input trigger waveguide (stage input) and each stage output; (b) Pulse waveform at input, output and through port, according to illustrative aspects of the invention.
Figure 5:
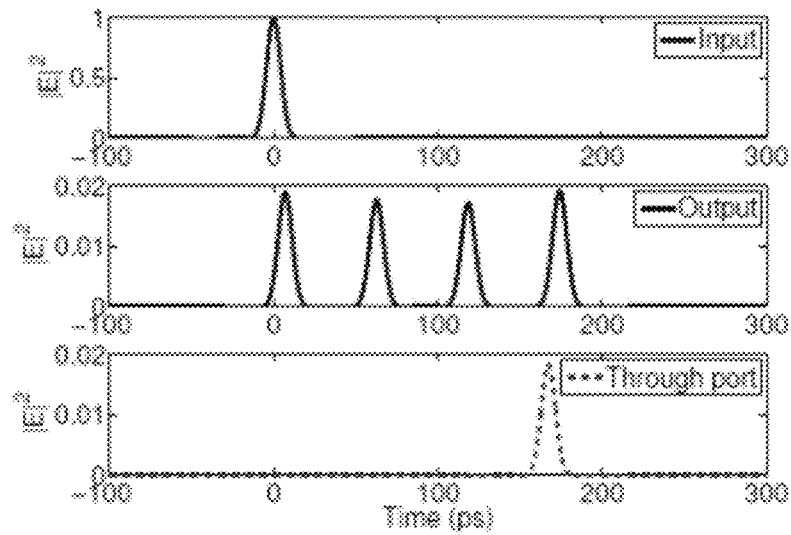

The center wavelength of the input pulse was fine tuned at 1549.93 nm, which is detuned from the resonance peak of the resonators at 1548.12 nm (FIG. 4(b)). Inverse fast Fourier transform (IFFT) of the product between the circuit transfer functions and the input pulse spectrum was applied to get the resulting time-domain waveform as shown in FIG. 5. FIG. 5(a) shows the input pulse evolution in the trigger waveguide (black lines) and corresponding stage outputs (red lines). The input pulse propagating in the trigger waveguide becomes progressively smaller since it couples to the microrings and drops a small portion of the pulse at the output of each stage when passing through them. When the coupling coefficient of each stage is properly designed, the output pulses are almost identical as shown in the black solid line in FIG. 5(b). The amplitudes of the output pulses are reduced by 6 dB compared to the stage output due to the output power combining loss.

Because the center frequency of the input pulse was detuned to off-resonance, the through port transfer function was nonzero in the input bandwidth. Therefore, part of the input energy will pass through the network to the through port ((red) dash line in FIG. 5(b)), resulting an extra power loss of the whole system. However, this signal may be used as an extra tap in other applications.

The output waveform exhibited no distortion since dispersion was not considered in our analysis. Although dispersion can be significant in high index contrast SOI waveguides, its impact was relatively small due to the short on-chip traveling distance. For example, the material dispersion of silicon is about −880 ps/nm-km at 1550 nm Without dispersion compensation, for a 10 ps Gaussian pulse, which corresponds to a spectral width of 0.35 nm, the pulse broadening is only 30 fs after 10 cm on-chip propagation, which is small compared to the original pulse. Furthermore, the anomalous waveguide dispersion can be achieved by tailoring the cross-sectional size of the SOI waveguides, thus compensating the effect of the normal material dispersion and reducing the total dispersion in the waveguides.

The overall efficiency of the embodied pulse train generator is primarily affected by the waveguide loss and output combiner. For the designed four-tap prototype, as shown in FIG. 4(b), each stage couples out about 10% of the input pulse energy. Therefore, about 40% input energy is delivered to the four stage outputs. The power loss is caused by the assumed 3 dB/cm waveguide propagation loss. At the system output, another 6 dB loss is introduced by the output combiner compared to the stage outputs. The overall efficiency of the four-tap prototype is reduced to about 10%, including the through port output. It can be further improved to about 20% if the waveguide loss is reduced to 1 dB/cm.

There are three issues that should be addressed in terms of device fabrication and system implementation: 1) the loss of waveguides and microrings, 2) the shift of resonant frequencies due to the process variation, and 3) the efficiency of the output combiner, which introduces high power loss at large number of stages.

The SOI waveguide loss caused by the sidewall roughness has been studied extensively. Thermal oxidation, or even double thermal oxidation, can effectively smooth the waveguide sidewalls, and propagation loss as low as 1-2 dB/cm can be achieved (for example, 1.7 dB/cm has been reported). An even lower loss of 0.3 dB/cm has been reported by using an etchless process based on selective oxidation. Characterizing and minimizing the waveguide loss is important since the coupler design depends on the exact loss number of the delay lines and the overall efficiency of the system is significantly affected by the waveguide loss. Therefore, careful characterization and optimization of fabrication steps are advised to minimize the loss and obtain the accurate number.

Figure 6:
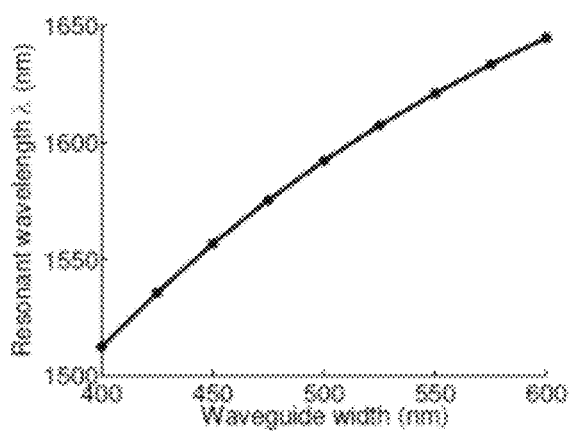
FIG. 6 shows the change of resonant wavelength vs. microring width. The ring has a nominal radius of 5 mm and a cross section of 450 nm×250 nm, according to an illustrative aspect of the invention.

Process variation is unavoidable but critical for successfully implementing the microring based devices. FIG. 6 is a FDTD simulation result showing the change of resonant wavelength as the width of the microring changes. The slope of the curve is relatively high, which means that a small change in the microring width will significantly affect the resonant frequency. For example, a width change of ±2 nm at 450 nm will result in the wavelength change of 1.6 nm at 1557 nm, which is very large, since the filter bandwidth is only several nanometers. The process variation could easily cause the random shift of the resonant peaks, even the split of peaks in the output spectrum of the embodied system. Therefore, precise control of the resonant frequency becomes crucial for the success of microring-based systems. Optimization and calibration of the e-beam dose can mitigate the problem; for example, a 5 nm dimensional control has been demonstrated in a SiN microring resonator. In addition, tuning capability of the microring, either thermally or electro-optically, has been introduced to precisely control its resonance frequency. Furthermore, future lithography in production can do better in both accuracy and uniformity.

Figure 7:
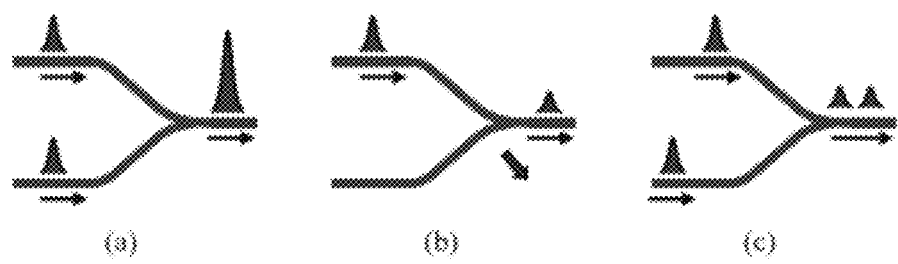
FIG. 7. (a) Coherent combination of the two-branch inputs; (b) Transmission of a single branch input; (c) Combination of two asynchronously timed pulses, according to an illustrative aspect of the invention.

The output combiner is another issue that limits the circuit performance. For most of the passive on-chip power combiners, such as Y junctions and MMI couplers, typical focus is on their characteristics of coherent power combination. FIG. 7(a) illustrates such an example in a two-branch symmetric Y-junction. When the two input pulses are in phase, the output power is the sum of the two input powers, and there should ideally be no power loss. However, if there is only one pulse incident from one arm (FIG. 7(b)), both even and odd modes will be equally excited at the transition region. While the odd mode will convert into the higher order mode and radiate, the output power is only carried by the even mode, which is half of the input power. Therefore, in the instant application (FIG. 7(c)), when the two input pulses arrive at the two arms asynchronously, two pulses appear sequentially at the output, but are halved in power. This asynchronous power combination results in a $10 \log_{10} M$ dB power loss, which will increase rather slowly as the number of stages, M, increases.

Figure 8:
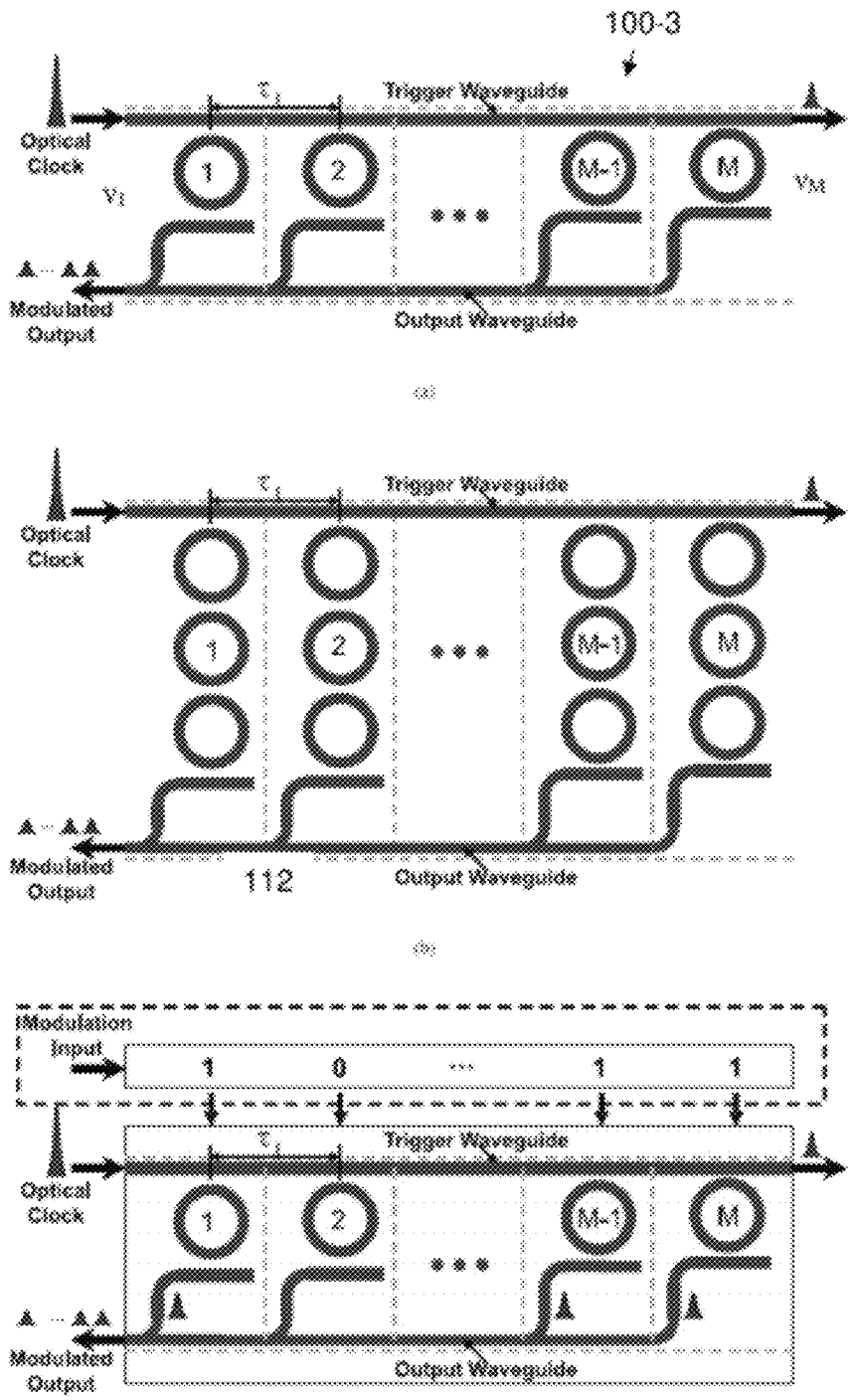
FIG. 8 shows: a) A schematic of a multi-wavelength M-tap, first-order pulse-train generator OPTG$_{\lambda(n)}$; (b) A multi-wavelength M-tap, third-order pulse-train generator; (c) A multi-wavelength M-tap, first-order pulse-train modulator, according to illustrative embodiments of the invention.

Another embodiment of the invention is a multi-wavelength optical pulse train generator $OPTG_{\lambda(n)}$ 100-3 as illustrated in FIG. 8(a). In the $OPTG_{\lambda(n)}$, M stages resonate at M different frequencies $v_M$ instead of at the same frequency v as in the single-wavelength $OPTG_{\lambda(1)}$. The $OPTG_{\lambda(n)}$ utilizes a broadband input trigger signal, such as ultrashort pulses from a femtosecond fiber laser, whose bandwidth covers all of the M channels. All of the M stages are coupled to the input trigger waveguide in series. When the input pulse propagates in the trigger waveguide, the input power at the different resonant frequencies is coupled into the corresponding stages, generating pulses with different center frequencies at the stage outputs. In an advantageous aspect as illustrated in FIG. 8(b), higher-order (e.g., $3^{rd}$ as illustrated) microring add-drop filters, which have faster roll-offs, are used to reduce the crosstalk between adjacent stages. As each stage acts as a narrow-band filter, the output pulses will become wider in the time domain, compared to the input pulse. As in the single-wavelength $OPTG_{\lambda(1)}$ (e.g., FIG. 2(b), delay units are disposed between stages in the input trigger waveguide, which generate a temporal stage delay between the pulses, determining the repetition rate of the output pulse train. A single output waveguide 812, rather than an optical combiner 110 (e.g., M-to-1 multi-branch power combiner; see, e.g., FIG. 1) can be used to combine all the stage outputs and form the optical pulse train. Because different stage output pulses have different wavelengths, they will not be coupled back into the other stages when passing through them, i.e., there is no "back-coupling" problem. This removes the need to use, e.g., an M-to-1 multi-branch power combiner at the circuit output, eliminating the $10 \log_{10} M$ dB power loss caused by asynchronous optical power combination.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A time domain optical waveform generator apparatus, comprising:
   a component that provides a single optical trigger pulse;
   an input optical waveguide disposed to receive the single optical trigger pulse;
   a plurality of coupler stages disposed along and each coupled directly to the input optical waveguide, wherein each coupler stage is characterized by a coupling coefficient that operates on the single optical trigger pulse that can be adjusted to determine an amplitude of an output optical pulse from each coupler stage;
   a modulation input providing time domain digital data directly modulating in the time domain each of the coupling stages with a respective modulation signal that controls the coupling coefficient of the respective coupling stage during operation thereof on the single optical trigger pulse, said respective modulation signals not being constrained to being the same for different coupling stages;
   a plurality of optical time-delay stages each one of which is disposed in the input optical waveguide, intermediate each adjacent pair of coupler stages, wherein each of the time-delay stages is characterized by an adjustable time delay that operates on the single optical trigger pulse;
   an output component optically coupled to the plurality of coupler stages that optically combines the output pulses of the plurality of coupler stages into a pulse train output waveform, wherein a customized output pulse train waveform is created from a plurality of time-interleaved optical signals outputted from the plurality of coupler stages and outputted from the output component.

2. The apparatus of claim 1, wherein the output component is an output combiner.

3. The apparatus of claim 1, wherein the output component is an optical waveguide.

4. The apparatus of claim 1, wherein each coupler stage is at least one optical microring resonator.

5. The apparatus of claim 4, wherein the at least one optical microring resonator is an electro-optic modulator.

6. The apparatus of claim 5, in which the modulation input comprises a digital data bus coupled to the at least one of the electro-optic modulators, wherein digital data to be transmitted directly modulates each microring modulator to generate a modulated, customized output pulse train waveform.

7. The apparatus of claim 4, wherein the optical waveguides and the at least one optical microring resonator are silicon and are built on a silicon on insulator (SOI) platform.

8. The apparatus of claim 4, wherein the at least one optical microring resonator has a racetrack configuration.

9. The apparatus of claim 4, wherein the at least one optical microring resonator has a square configuration.

10. The apparatus of claim 4, wherein the at least one optical microring resonator has a rectangular configuration.

11. The apparatus of claim 4, wherein the plurality of optical microring resonators have a same resonant frequency.

12. The apparatus of claim 4, wherein each coupler stage has a different gap distance from the input optical waveguide.

13. The apparatus of claim 1, wherein the output combiner is one of a Y-junction and a multimode interference coupler.

14. The apparatus of claim 1, wherein the coupling coefficients have been adjusted to provide equal power coupling of the input optical pulse into each respective coupler stage.

* * * * *